United States Patent
Hwang

(10) Patent No.: US 10,430,124 B1
(45) Date of Patent: Oct. 1, 2019

(54) DISK MANAGING METHOD AND RAID CONTROLLER

(71) Applicant: ASMedia Technology Inc., New Taipei (TW)

(72) Inventor: Wei-Kan Hwang, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 0 days.

(21) Appl. No.: 16/109,777

(22) Filed: Aug. 23, 2018

(30) Foreign Application Priority Data

Apr. 18, 2018 (TW) .............................. 107113250 A

(51) Int. Cl.
*G06F 3/06* (2006.01)

(52) U.S. Cl.
CPC .......... *G06F 3/0689* (2013.01); *G06F 3/0604* (2013.01); *G06F 3/0646* (2013.01)

(58) Field of Classification Search
CPC .............................. G06F 3/0689; G06F 3/0646
USPC .......................................................... 711/114
See application file for complete search history.

(56) References Cited

U.S. PATENT DOCUMENTS

| 8,621,461 | B1* | 12/2013 | Chandrachari | G06F 9/45545 718/1 |
| 2003/0200290 | A1* | 10/2003 | Zimmerman | G06F 9/4416 709/222 |
| 2010/0332748 | A1* | 12/2010 | van der Goot | G06F 3/0613 711/114 |
| 2013/0290608 | A1 | 10/2013 | Nelogal et al. | |
| 2014/0173268 | A1 | 6/2014 | Hashimoto | |
| 2017/0115904 | A1 | 4/2017 | Hashimoto | |

FOREIGN PATENT DOCUMENTS

| CN | 102063377 B | 9/2013 |
| CN | 102096639 B | 6/2014 |
| TW | 201118570 A | 6/2011 |
| TW | 201324140 A | 6/2013 |
| WO | 2013/027642 A1 | 2/2013 |

\* cited by examiner

*Primary Examiner* — Jae U Yu
(74) *Attorney, Agent, or Firm* — CKC & Partners Co., LLC

(57) ABSTRACT

A disk managing method includes: receiving a host Frame Information Structure (FIS) including multiple host logical Block Address Range Entries (LBA Range Entries) from a host; determining whether the LBA Range Entries satisfy a speed up processing condition; generating a first and a second addresses corresponding to a first and a second hard disks according to the host LBA Range Entries; and outputting a first and a second hard disk FIS to the first and the second hard disk for management. The number of first and second hard disk LBA Range Entries in the first and the second hard disk FIS are respectively half of the number of the host LBA Range Entries.

10 Claims, 5 Drawing Sheets

DISK MANAGING METHOD AND RAID CONTROLLER

RELATED APPLICATIONS

This application claims priority to Taiwan Application Serial Number 107113250, filed Apr. 18, 2018, which is herein incorporated by reference.

BACKGROUND

Technical Field

The present disclosure relates to a disk managing method and a raid controller. More particularly, the present disclosure relates to the disk managing method and the raid controller applied for the RAID supporting Trim commands.

Description of Related Art

In the Advanced Technology Attachment (ATA) Specification, Data Set Management commands including the support for Trim commands are defined. As the solid state disks being widely used nowadays, increasingly importance has been attached to the needs of supporting the Trim function.

However, for the RAIDs, additional dividing operations for logical block address range entries (LBA range entries) are required when supporting the Trim function, which results in the issue of slow process of formatting.

SUMMARY

One aspect of the present disclosure is related to a disk managing method. The disk managing method includes receiving a host frame information structure including a plurality of host logical block address range entries from a host side; determining whether the plurality of host logical block address range entries satisfy a speed up processing condition; on the condition that the speed up processing condition is satisfied, generating a first address corresponding to a first hard disk and a second address corresponding to a second hard disk; and outputting a first hard disk frame information structure to the first hard disk according to the first address, and outputting a second hard disk frame information structure to the second hard disk according to the second address to manage the first hard disk and the second hard disk. The number of a plurality of first logical block address range entries in the first hard disk frame information structure and the number of a plurality of second logical block address range entries in the second hard disk frame information structure are respectively half of the number of the plurality of host logical block address range entries.

Another aspect of the present disclosure is related to a raid controller. In accordance with some embodiments of the present disclosure, the raid controller includes a first interface circuit configured to communicatively coupled to a host side, a second interface circuit configured to communicatively coupled to a first hard disk and a second hard disk, and a controlling circuit electrically coupled to the first interface circuit and the second interface circuit. The controlling circuit is configured to execute following operations including: receiving, via the first interface circuit, a host frame information structure including a plurality of host logical block address range entries from the host side; determining whether the plurality of host logical block address range entries satisfy a speed up processing condition; on the condition that the speed up processing condition is satisfied, generating a first address corresponding to the first hard disk and a second address corresponding to the second hard disk; and outputting, via the second interface circuit, a first hard disk frame information structure to the first hard disk according to the first address, and outputting a second hard disk frame information structure to the second hard disk according to the second address. The number of a plurality of first logical block address range entries in the first hard disk frame information structure and the number of a plurality of second logical block address range entries in the second hard disk frame information structure are respectively half of the number of the plurality of host logical block address range entries.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
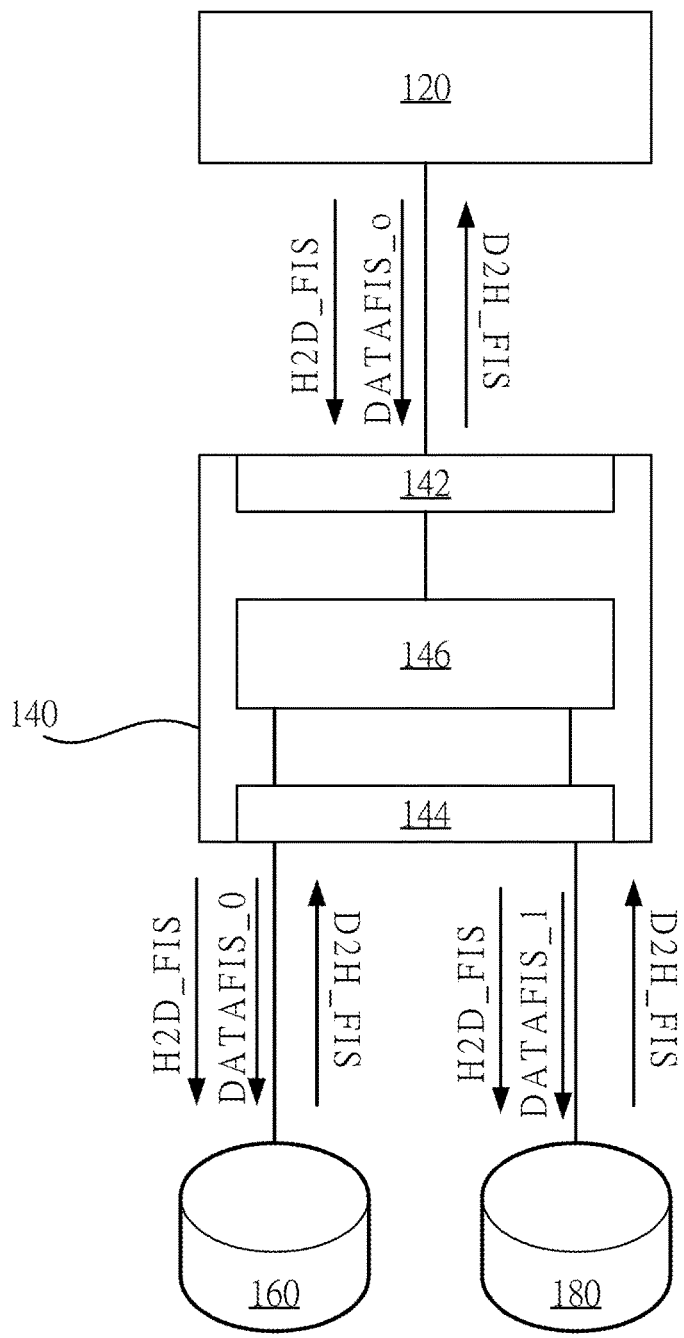
FIG. 1A is a diagram illustrating a disk array system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to. It will be understood that, in the description herein and throughout the claims that follow, the phrase "and/or" includes any and all combinations of one or more of the associated listed items.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements. In addition, in the description herein and throughout the claims that follow, although the terms "first," "second," etc. may be used to describe various elements, these elements should not be limited by these terms. These terms are only used to distinguish one element from another. Unless specifically mentioned in the context, such terms do not indicate or imply the sequences or the orders, and the disclosure is not limited thereto.

Reference is made to FIG. 1A. FIG. 1A is a diagram illustrating a disk array system 100 according to some embodiments of the present disclosure. As shown in FIG. 1A, in some embodiments, the disk array system 100 may be a Redundant Array of Independent Disks (RAID) system. For example, the disk array system 100 includes a host side 120, a RAID controller 140, a first hard disk 160 and a second hard disk 180. For example, the first hard disk 160 and the second hard disk 180 may be Hard Disk Drive (HDD) or Solid State Disk (SSD). In some embodiments, the first hard disk 160 and the second hard disk 180 may form a RAID0 level disk array, but the present disclosure is not limited thereto. In some other embodiments, the disk array system 100 may include three or more sets of hard disks, and thus the embodiments depicted in FIG. 1A is merely by example and not meant to limit the present disclosure.

As shown in FIG. 1A, the RAID controller 140 includes a first interface circuit 142, a second interface circuit 144, and a controlling circuit 146. The first interface circuit 142 is configured to be communicatively coupled to the host side 120. The second interface circuit 144 is configured to be communicatively coupled to the first hard disk 160 and the second hard disk 180. The controlling circuit 146 is electrically coupled to the first interface circuit 142 and the second interface circuit 144. The RAID controller 140 is configured to execute the commands outputted by the host side 120 connected to the RAID controller 140, and access the first hard disk 160 and the second hard disk 180 connected to the RAID controller 140.

For example, the host side 120 may output packets or frames of a Host to Device (H2D) frame information structure (FIS) H2D_FIS, to execute Trim commands by the Data Set Management (DSM) command, and notify the first hard disk 160 and the second hard disk 180 that data stored in a part of blocks of data in the logical block address (LBA) is no longer required.

Thus, the first hard disk 160 and the second hard disk 180 may determine how to use those LBA blocks of data freely, without keeping the content of the data blocks when new data is written. At the end, the first hard disk 160 and the second hard disk 180 correspondingly return the Device to Host (D2H) frame information structure D2H_FIS to the host side to send back the execution outcome or status of the Trim commands to the host side 120. The RAID controller 140 is configured to control and execute the data transmission between the host side 120 and the first hard disk 160 and the second hard disk 180.

Specifically, in some embodiments, each of the data frame information structure (Data FIS) sent by the DSM command may be 512 bytes respectively. The data frame information structure may include multiple LBA range entries, and each of the LBA range entries are formed by 8 bytes. Accordingly, each of the data FIS may include 64 LBA range entries in maximum.

As shown in FIG. 1A, the host side 120 outputs the host FIS DATAFIS_o to the RAID controller 140. However, in the data array, the continuous LBAs used by the host side 120 are interlaced and reorganized by the LBAs of the first hard disk 160 and the second hard disk 180 with a stripping size. For example, the stripping size may be 4K bytes, but the present disclosure is not limited thereto.

Figure 1B:
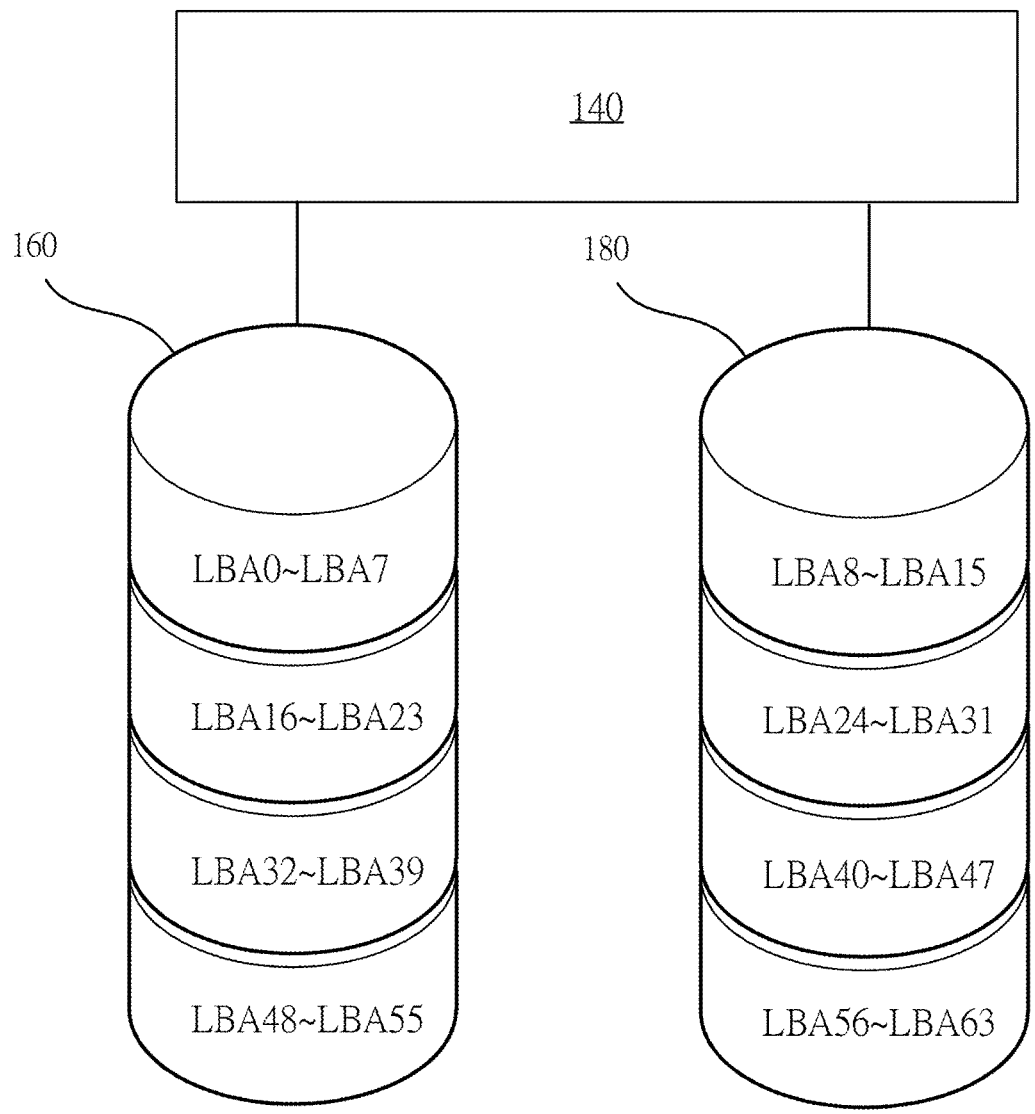
FIG. 1B is a diagram illustrating a RAID according to some embodiments of the present disclosure.

Reference is made to FIG. 1B together. FIG. 1B is a diagram illustrating the RAID of the RAID0 level according to some embodiments of the present disclosure. As shown in FIG. 1B, the host FIS DATAFIS_o outputted by the host side 120 includes 64 consecutive LBA range entries LBA0~LBA63. But in the implementation, the above LBA range entries LBA0~LBA63 are interlacing distributed based on the stripping size in the first hard disk 160 and the second hard disk 180. For example, the stripping size, as being 4K bytes, equals to 8 LBA range entries units accordingly. Thus, the first hard disk 160 includes LBA0~LBA7, LBA16~LBA23, LBA32~LBA39, LBA48~LBA55 used by the host side 120. On the other hand, the second hard disk 180 includes LBA8~LBA15, LBA24~LBA31, LBA40~LBA47, LBA56~LBA63 used by the host side 120.

Thus, the LBA8~LBA15 used by the host side 120 actually corresponds to the first 8 LBA range entries in the second hard disk 180. Therefore, the RAID controller 140 has to divide the LBA range entries sent from the host side 120 into corresponding LBA range entries and respectively send to the first hard disk 160 and the second hard disk 180 to execute commands.

Therefore, the RAID controller 140 has to divide multiple host LBA range entries in the host FIS DATAFIS_o and calculate the length of the LBA range entries and the start LBA corresponding to the first hard disk 160 and the second hard disk 180, in order to form the first hard disk FIS DATAFIS_0 and the second hard disk FIS DATAFIS_1 and output to the first hard disk 160 and the second hard disk 180 to execute commands.

In some embodiments of the present disclosure, on the condition that the host LBA range entries in the host FIS DATAFIS_o satisfy a speed up processing condition, the RAID controller 140 may be configured to perform the speed up operation to increase the efficiency of dividing the LBA range entries. By the speed up dividing operation, the number of first LBA range entries in the first hard disk FIS obtained by the first hard disk 160 and the number of second LBA range entries in the second hard disk FIS obtained by the second hard disk 180 are respectively half of the number of the host LBA range entries. In addition, the length of the first LBA range entries and the length of the second LBA range entries respectively obtained by the first hard disk 160 and the second hard disk 180 are respectively the same to the length of the host LBA range entries.

Accordingly, since the number of the LBA range entries decreases and the length maintain unchanged, when the first hard disk 160 and the second hard disk 180 perform the Trim operation, the operation speed may be increased. In addition, sine the number and the length of the LBA range entries are confirmed, during the speed up operation process, the RAID controller 140 is only required to perform divide operation to the first LBA range entry, and the start LBAs of the LBA range entries may be generated accordingly. Thus, the cost of the divide operation may be reduced, which further increases the operation speed.

For better understanding, the disk managing method executed by the RAID controller 140 and the divide operation of the LBA range entries will be discussed in details with various embodiments in accompanying with drawings in the following paragraphs.

Figure 2:
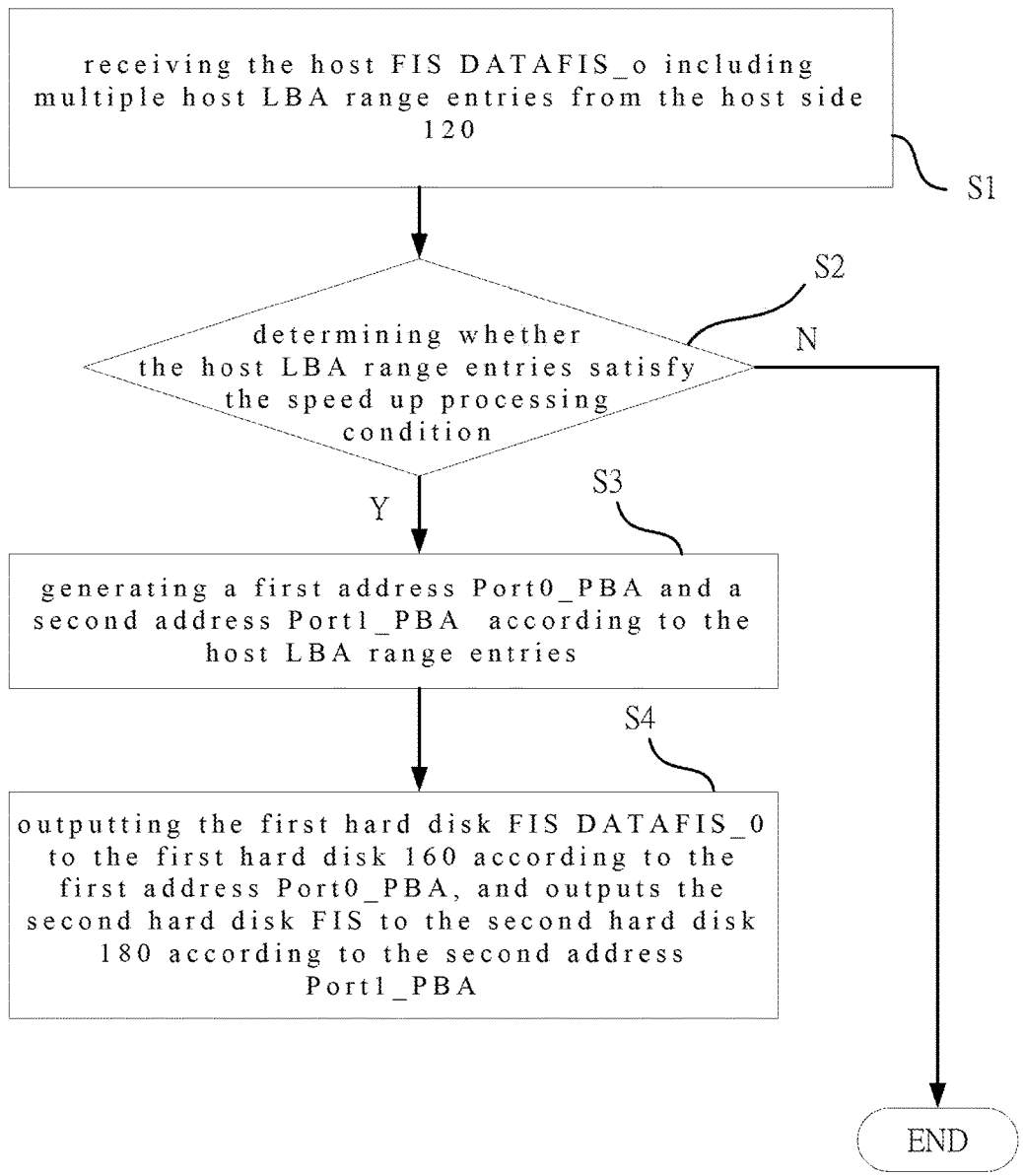
FIG. 2 is a flowchart diagram illustrating a disk managing method according to some embodiments of the present disclosure.

Reference is made to FIG. 2. FIG. 2 is a flowchart diagram illustrating a disk managing method 900 according to some embodiments of the present disclosure. It is noted that, the disk managing method 900 may be applied in the disk array system 100 having the same or similar structure as shown in FIG. 1A. For better understanding of the present disclosure, the disk managing method 900 is discussed in relation to the embodiments shown in FIG. 1A, but is not limited thereto.

As shown in FIG. 2, the disk managing method 900 includes operations S1, S2, S3, and S4. In some embodiments, the RAID controller 140 may execute the operations S1, S2, S3, and S4 by the controlling circuit 146 to implement the disk managing method 900.

First, in operation S1, the RAID controller 140 is configured to receive the host FIS DATAFIS_o including multiple host LBA range entries from the host side 120.

Specifically, in the operation S1, after the host side 120 sends the H2D DSM commands to instruct the RAID controller 140 to execute the Trim command to the disk array, the host FIS DATAFIS_o may be outputted. The host FIS DATAFIS_o includes the host LBA range entries which should be transmitted to the first hard disk 160 and the second hard disk 180.

Next, in the operation S2, the RAID controller 140 is configured to determine whether the host LBA range entries satisfy the speed up processing condition.

Figure 3:
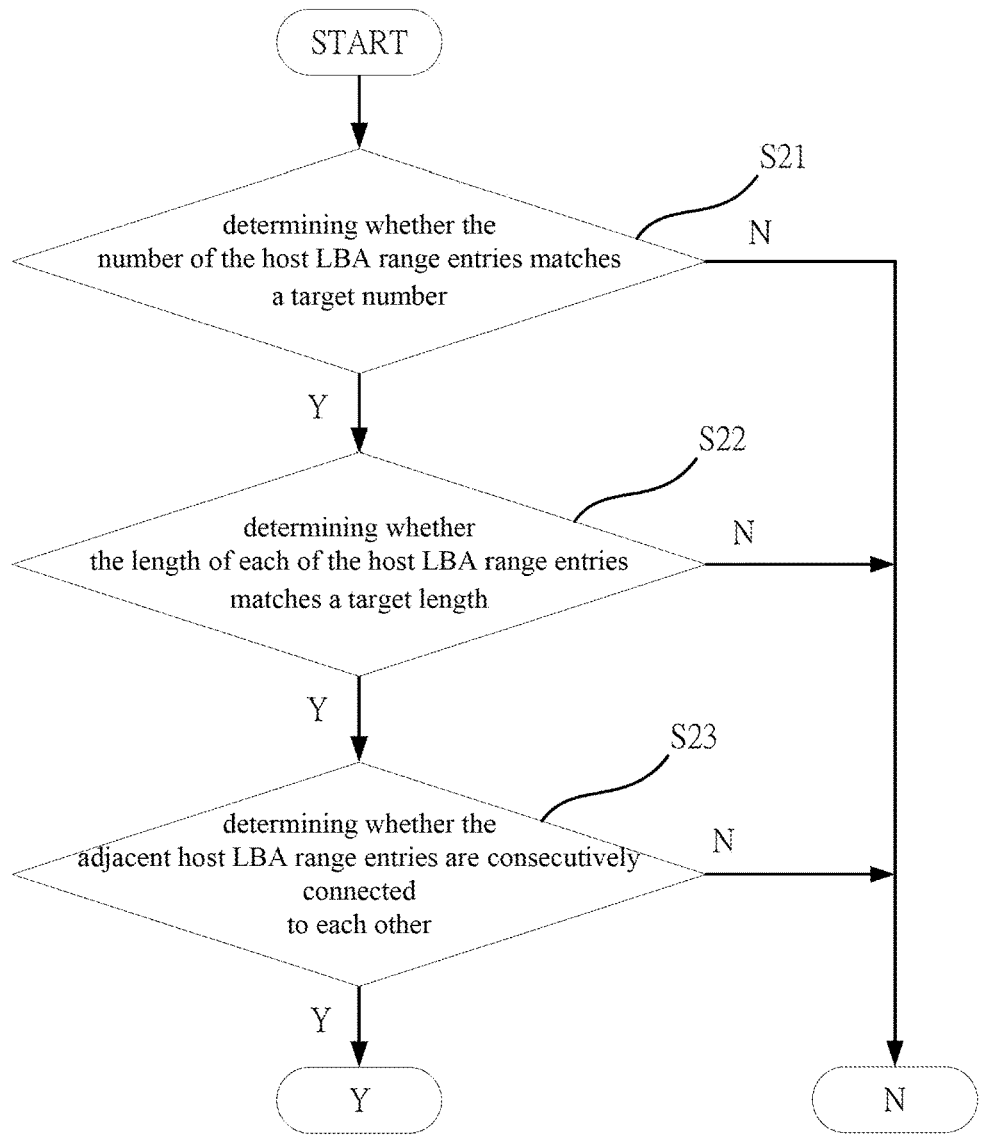
FIG. 3 is a detailed flowchart diagram illustrating operation of the disk managing method according to some embodiments of the present disclosure.

Reference is made to FIG. 3 together. FIG. 3 is a detailed flowchart diagram illustrating operation S2 of the disk managing method 900 according to some embodiments of the present disclosure. As shown in FIG. 3, the operation S2 includes operation S21, S22, and S23.

First, in the operation S21, the RAID controller 140 is configured to determine whether the number of the host LBA range entries matches a target number. Specifically, in some embodiments, the target number may be 32 or 64. Alternatively stated, when the host FIS DATAFIS_o exactly includes 32 or 64 effective LBA range entries (i.e., including 32 or 64 start LBA), the RAID controller 140 determines this condition is satisfied and continues following condition examination. If not, the RAID controller 140 exits the examination process and determines the speed up processing condition is not satisfied.

Next, in the operation S22, the RAID controller 140 is configured to determine whether the length of each of the host LBA range entries matches a target length. For example, in some embodiments, the RAID controller 140 determines whether the length of each of the host LBA range entries is 65535 (i.e., FFFFh). If this condition is satisfied, the RAID controller 140 is configured to continue following condition examination. If not, the RAID controller 140 exits the examination process and determines the speed up processing condition is not satisfied.

Next, in the operation S23, the RAID controller 140 is configured to determine whether a difference between a start LBA of each one of the host LBA range entries and the start LBA of the next host LBA range entry is the target length. Alternatively stated, the RAID controller 140 is configured to determine whether the adjacent host LBA range entries are consecutively connected to each other.

For example, if the start LBA of the first LBA range entry is 0, and the length is checked to be the target length FFFFh, the RAID controller 140 may check whether the start LBA of the second LBA range entry is 0x00000000FFFF. If yes, the adjacent host LBA range entries are consecutively connected to each other. In a similar way, if the adjacent host LBA range entries are consecutively connected to each other, the speed up processing condition is satisfied if three conditions mentioned above are met. On the other hand, if the adjacent host LBA range entries are not consecutively connected to each other, the RAID controller 140 exits the examination process and determines the speed up processing condition is not satisfied.

Reference is made to FIG. 2 again. As shown in FIG. 2, if the speed up processing condition is not satisfied, the disk managing method 900 ends, and the RAID controller 140 may apply the traditional method to perform dividing operations sequentially. On the other hand, when the speed up processing condition is satisfied, the RAID controller 140 executes operation S3. In the operation S3, the RAID controller 140 respectively generates a first address Port0_PBA corresponding to the first hard disk 160, and a second address Port1_PBA corresponding to the second hard disk 180 according to the host LBA range entries. The first address Port0_PBA is the start LBA of the first LBA range entry in the first hard disk 160 correspondingly, and the second address Port1_PBA is the start LBA of the first LBA range entry in the second hard disk 180 correspondingly.

Figure 4:
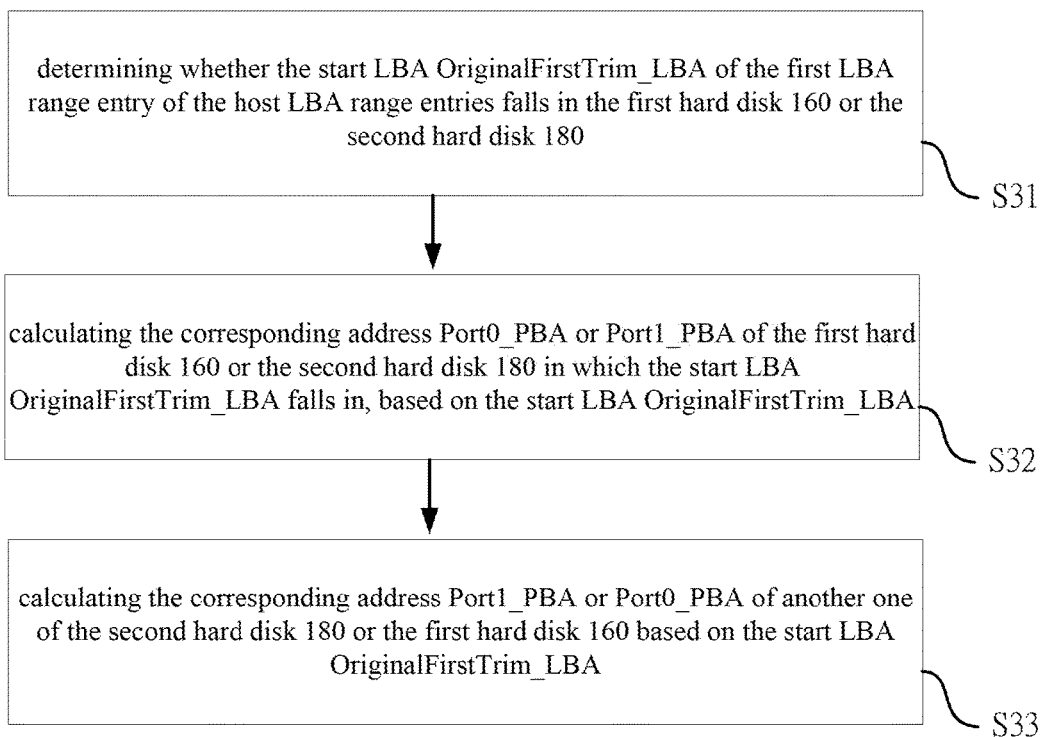
FIG. 4 is a detailed flowchart diagram illustrating operation of the disk managing method according to some embodiments of the present disclosure.

Reference is made to FIG. 4. FIG. 4 is a detailed flowchart diagram illustrating operation S3 of the disk managing method 900 according to some embodiments of the present disclosure. As shown in FIG. 4, the operation S3 includes operation S31, S32, and S33.

First, in the operation S31, the RAID controller 140 determines whether the start LBA OriginalFirstTrim_LBA of the first LBA range entry of the host LBA range entries falls in the first hard disk 160 or the second hard disk 180.

Next, in the operation S32, the RAID controller 140 calculates the corresponding address Port0_PBA or Port1_PBA of the first hard disk 160 or the second hard disk 180 in which the start LBA OriginalFirstTrim_LBA falls in, based on the start LBA OriginalFirstTrim_LBA.

Next, in the operation S33, the RAID controller 140 calculates the corresponding address Port1_PBA or Port0_PBA of another one of the second hard disk 180 or the first hard disk 160 based on the start LBA OriginalFirstTrim_LBA.

Alternatively stated, in the operations S32, S33, the RAID controller 140 may respectively calculate the corresponding first address Port0_PBA and second address Port1_PBA based on the start LBA OriginalFirstTrim_LBA of the first LBA range entry. The detailed calculation in the operations S32, S33 may be obtained by applying corresponding left-shift, right-shift and modulo operation to perform the basic arithmetic operations including addition, subtraction, multiplication and division. One skilled in the art can understand how to divide and obtain the corresponding start LBA of the hard disk where the start LBA OriginalFirstTrim_LBA located in, and the corresponding start LBA of another hard disk, and thus further explanation are omitted herein for the sake of brevity.

Reference is made to FIG. 2 again. As shown in FIG. 2, when the first address Port0_PBA corresponding to the first hard disk 160 and the second address Port1_PBA corresponding to the second hard disk 180 are generated, the RAID controller 140 executes the operation S4. In the operation S4, the RAID controller 140 outputs the first hard disk FIS DATAFIS_0 to the first hard disk 160 according to the first address Port0_PBA, and outputs the second hard disk FIS to the second hard disk 180 according to the second address Port1_PBA to manage the first hard disk 160 and the second hard disk 180.

As stated in the above paragraphs, the number of the first LBA range entries in the first hard disk FIS DATAFIS_0 and the number of the second LBA range entries in the second hard disk FIS DATAFIS_1 are respectively half of the number of the host LBA range entries, and the lengths are respectively the same to the length of the host LBA range entries. Therefore, the RAID controller 140 may calculate the start LBA of each one of the first LBA range entries in the first hard disk FIS DATAFIS_0 sequentially according to the first address Port0_PBA and the length of the host LBA range entries, so as to generate the first hard disk FIS DATAFIS_0.

Similarly, the RAID controller 140 may calculate the start LBA of each one of the second LBA range entries in the second hard disk FIS DATAFIS_1 sequentially according to the second address Port1_PBA and the length of the host LBA range entries, so as to generate the second hard disk FIS DATAFIS_1.

For example, the RAID controller starts from the first address Port0_PBA, adding the length of the LBA range entries (e.g., FFFFh) to obtain the start LBA of the next range entry, and repeating the above process to generate the first hard disk FIS DATAFIS_0 corresponding to the first hard disk 160. The second hard disk FIS DATAFIS_1 may be calculated in the similar way and thus further explanation are omitted herein for the sake of brevity.

For example, if there are total 64 LBA range entries in the host FIS DATAFIS_o sent from the host side 120, the new generated first hard disk FIS DATAFIS_0 and the second hard disk FIS DATAFIS_1 will include 32 LBA range entries respectively. If there are total 32 LBA range entries in the host FIS DATAFIS_o sent from the host side 120, the new generated first hard disk FIS DATAFIS_0 and the second hard disk FIS DATAFIS_1 will include 16 LBA range entries respectively.

Taking the first hard disk FIS DATAFIS_0 as an example, assuming the start LBA of the first LBA range entry, i.e., the first address Port0_PBA, obtained in the operation S3 is 0x000000000000, the start LBA of the second LBA range entry may be indicated as the sum of the first address Port0_PBA and the length of the entry, which is 0x000000000000+0x0000FFFF=0x00000000FFFF.

Similarly, the start LBA of the third LBA range entry may be indicated as the sum of the start LBA of the second LBA range entry and the length of the entry, which is 0x00000000FFFF+0x0000FFFF=0x00000001FFFE, and so on.

Accordingly, the disk managing method 900 may realize the division of massive, consecutively-connected LBA range entries with the length of 65545(FFFFh), and output the corresponding hard disk FIS DATAFIS_0, DATAFIS_1 to the first hard disk 160 and the second hard disk 180, to perform the Trim function for the first hard disk 160 and the second hard disk 180 in order to manage the hard disks.

As stated in the above paragraphs, comparing the LBA range entries before and after the division executed by the RAID controller 140, the number of the entries decreases by half, and the length of the entries remains unchanged. Accordingly, the operation speed to process Trim operation for the first disk 160 and the second disk 180 improves.

Furthermore, during the speed up operation process, the RAID controller 140 is only required to perform divide operation to the start LBA of the first LBA range entry, and the start LBAs of other LBA range entries may be generated accordingly. Thus, the cost of the divide operation may be reduced, which further increases the operation speed.

It is noted that, in some other embodiments, the disk array system 100 may also apply other combinations of the disk array. For example, the disk array system 100 may be a two stage RAID00 level structure. In the first stage, 64 LBA range entries are divided to two sets of 32 LBA range entries. In the second stage, the 32 LBA range entries are further divided to two sets of 16 LBA range entries, to provide 4 hard disk FIS to four corresponding hard disk. Accordingly, the disk array system 100 depicted in the drawing is only for exemplary purpose and not meant to limit the present disclosure.

In addition, in some embodiments, the disk managing method 900 may be implemented as a computer program. When the computer program is executed by a computer, an electronic device, or one or more processing circuits, this executing device performs the disk managing method 900. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned disk managing method 900, no particular sequence is required unless otherwise specified. Moreover, the operations may also be performed simultaneously or the execution times thereof may at least partially overlap. Furthermore, the operations of the disk managing method 900 may be added to, replaced, and/or eliminated as appropriate, in accordance with various embodiments of the present disclosure.

Through the operations of various embodiments described above, the RAID controller 140 may complete the dividing process of the LBA range entries more quickly without introducing additional hardware, and solve the issue of low format speed of disk array system, such as a RAID0 level system, when supporting the Trim function.

Although the present disclosure has been described in considerable detail with reference to certain embodiments thereof, other embodiments are possible. Therefore, the scope of the appended claims should not be limited to the description of the embodiments contained herein.

What is claimed is:

1. A disk managing method, comprising:
   receiving a host frame information structure comprising a plurality of host logical block address range entries from a host side;
   determining whether the plurality of host logical block address range entries satisfy a speed up processing condition;
   on the condition that the speed up processing condition is satisfied, generating a first address corresponding to a first hard disk and a second address corresponding to a second hard disk; and
   outputting a first hard disk frame information structure to the first hard disk according to the first address, and outputting a second hard disk frame information structure to the second hard disk according to the second address to manage the first hard disk and the second hard disk;
   wherein the number of a plurality of first logical block address range entries in the first hard disk frame information structure and the number of a plurality of second logical block address range entries in the second hard disk frame information structure are respectively half of the number of the plurality of host logical block address range entries.

2. The disk managing method of claim 1, wherein operations of determining whether the plurality of host logical block address range entries satisfy the speed up processing condition comprises:
   determining whether the number of the plurality of host logical block address range entries matches a target number;
   determining whether the length of each of the plurality of host logical block address range entries matches a target length; and
   determining whether a difference between a start logical block address of each one of the plurality of host logical block address range entries and the start logical block address of the next host logical block address range entry is the target length.

3. The disk managing method of claim 1, wherein the length of the plurality of first logical block address range entries and the length of the plurality of second logical block address range entries are respectively the same to the length of the plurality of host logical block address range entries.

4. The disk managing method of claim 1, wherein operations of generating the first address and the second address comprises:
   determining whether a start logical block address of a first logical block address range entry of the plurality of host logical block address range entries falls in the first hard disk or the second hard disk; and
   calculating the corresponding first address and the corresponding second address based on the start logical block address of the first logical block address range entry.

5. The disk managing method of claim 1, wherein operations of outputting the first hard disk frame information structure and the second hard disk frame information structure comprises:
   calculating a start logical block address for each of the plurality of first logical block address range entries to generate the first hard disk frame information structure according to the first address and the length of each of the plurality of host logical block address range entries; and
   calculating the start logical block address for each of the plurality of second logical block address range entries to generate the second hard disk frame information structure according to the second address and the length of each of the plurality of host logical block address range entries.

6. A raid controller, comprising:
   a first interface circuit, configured to communicatively coupled to a host side;
   a second interface circuit, configured to communicatively coupled to a first hard disk and a second hard disk; and
   a controlling circuit, electrically coupled to the first interface circuit and the second interface circuit, and configured to execute following operations comprising:
      receiving, via the first interface circuit, a host frame information structure comprising a plurality of host logical block address range entries from the host side;
      determining whether the plurality of host logical block address range entries satisfy a speed up processing condition;
      on the condition that the speed up processing condition is satisfied, generating a first address corresponding to the first hard disk and a second address corresponding to the second hard disk; and
      outputting, via the second interface circuit, a first hard disk frame information structure to the first hard disk according to the first address, and outputting a second hard disk frame information structure to the second hard disk according to the second address;
      wherein the number of a plurality of first logical block address range entries in the first hard disk frame information structure and the number of a plurality of second logical block address range entries in the second hard disk frame information structure are respectively half of the number of the plurality of host logical block address range entries.

7. The raid controller of claim 6, wherein when determining whether the plurality of host logical block address range entries satisfy the speed up processing condition, the controlling circuit is further configured to execute following operations comprising:
   determining whether the number of the plurality of host logical block address range entries matches a target number;
   determining whether the length of each of the plurality of host logical block address range entries matches a target length; and
   determining whether a difference between a start logical block address of each one of the plurality of host logical block address range entries and the start logical block address of the next host logical block address range entry is the target length.

8. The raid controller of claim 6, wherein the length of the plurality of first logical block address range entries and the length of the plurality of second logical block address range entries are respectively the same to the length of the plurality of host logical block address range entries.

9. The raid controller of claim 6, wherein when generating the first address and the second address, the controlling circuit is further configured to execute following operations comprising:
   determining whether a start logical block address of a first logical block address range entry of the plurality of host logical block address range entries falls in the first hard disk or the second hard disk; and
   calculating the corresponding first address and the corresponding second address based on the start logical block address of the first logical block address range entry.

10. The raid controller of claim 6, wherein when outputting the first hard disk frame information structure and the second hard disk frame information structure, the controlling circuit is further configured to execute following operations comprising:
    calculating a start logical block address for each of the plurality of first logical block address range entries to generate the first hard disk frame information structure according to the first address and the length of each of the plurality of host logical block address range entries; and
    calculating the start logical block address for each of the plurality of second logical block address range entries to generate the second hard disk frame information structure according to the second address and the length of each of the plurality of host logical block address range entries.

* * * * *